(12) United States Patent  
Herasymchuk

(10) Patent No.: US 7,757,425 B2  
(45) Date of Patent: Jul. 20, 2010

(54) FISHING LURE

(76) Inventor: Vasyl Volodymyrovych Herasymchuk, 1-A Grygorenka Square, ap. 4, Lviv 79007 (UA)

( * ) Notice: Subject to any disclaimer, the term of this patent is extended or adjusted under 35 U.S.C. 154(b) by 0 days.

(21) Appl. No.: 12/120,434

(22) Filed: May 14, 2008

(65) Prior Publication Data

US 2009/0282726 A1 Nov. 19, 2009

(51) Int. Cl.
*A01K 85/00* (2006.01)
(52) U.S. Cl. .................................. 43/42.23
(58) Field of Classification Search ............. 43/42.09, 43/42.23, 42.46, 42.47, 42.48
See application file for complete search history.

(56) References Cited

U.S. PATENT DOCUMENTS

| | | | |
|---|---|---|---|
| 2,152,275 A | * | 3/1939 | Parkins ............ 43/42.08 |
| RE22,032 E | | 2/1942 | Donally |
| 2,295,292 A | * | 9/1942 | Rogers ............ 43/42.09 |
| 2,357,472 A | * | 9/1944 | Jenkins ............ 43/42.02 |
| D153,128 S | | 3/1949 | Ferris |
| 2,465,064 A | * | 3/1949 | Colosimo ............ 43/42.09 |
| 2,617,226 A | * | 11/1952 | Yoshii ............ 43/42.11 |
| 2,750,701 A | * | 6/1956 | Beames ............ 43/42.09 |
| 2,986,838 A | * | 6/1961 | Smyser ............ 43/42.36 |
| 3,367,057 A | * | 2/1968 | Pond ............ 43/42.02 |
| 3,867,781 A | * | 2/1975 | Wolfe ............ 43/42.09 |
| 4,024,668 A | | 5/1977 | McDiamid |
| 4,030,225 A | | 6/1977 | Earley |
| 4,054,004 A | | 10/1977 | Schott |
| 4,060,926 A | | 12/1977 | Cordell |
| 4,090,317 A | | 5/1978 | Skwirut |
| 4,134,224 A | | 1/1979 | Clark |
| 4,135,323 A | | 1/1979 | Eston |
| 4,155,191 A | | 5/1979 | Spivey |
| 4,164,826 A | | 8/1979 | Metzler |
| 4,201,007 A | | 5/1980 | Backstrom |
| 4,208,822 A | | 6/1980 | Bryant |
| 4,266,360 A | | 5/1981 | Smith |
| 4,320,592 A | | 3/1982 | Kirsch |
| 4,402,155 A | | 9/1983 | Mumma |
| 4,435,914 A | | 3/1984 | Norman |
| 4,735,012 A | | 4/1988 | Smith |
| 4,748,763 A | | 6/1988 | Giraudo |
| 4,794,722 A | | 1/1989 | Crevoisier |
| 4,807,387 A | | 2/1989 | Dougherty |
| 4,807,388 A | | 2/1989 | Cribb |
| 4,831,768 A | | 5/1989 | Sorace |
| 4,914,851 A | | 4/1990 | Acker |
| 4,980,987 A | | 1/1991 | Ramsey |
| 4,982,524 A | | 1/1991 | Vissing |
| 5,024,019 A | | 6/1991 | Rust |
| 5,090,151 A | | 2/1992 | Salminen |
| 5,329,721 A | | 7/1994 | Smith |
| 5,379,543 A | | 1/1995 | Avent |

(Continued)

*Primary Examiner*—Thomas Price
(74) *Attorney, Agent, or Firm*—Defillo & Associates, Inc.; Evelyn A. Defillo

(57) ABSTRACT

The present invention provide a fishing lure with big range of possible wobbling actions due certain amount of degrees of freedom of the joint between two lure's members—skeleton and vibrating body. The amount of degrees of freedom could be changed by fishermen, allowing the vibrating body movement relative to the skeleton and generating wobbling movements by the way of planar or three dimensional vibrating around axes perpendicular to a retrieval direction and/or rotating around an axis which is collinear or parallel to a retrieval direction.

21 Claims, 7 Drawing Sheets

U.S. PATENT DOCUMENTS

| | | |
|---|---|---|
| 5,406,738 A | 4/1995 | Holleman |
| 5,678,350 A | 10/1997 | Moore |
| 5,829,183 A | 11/1998 | Guerin |
| 5,832,654 A | 11/1998 | McQueeny |
| 5,862,623 A | 1/1999 | MacPherson |
| 5,911,571 A | 6/1999 | Wittbrot |
| 5,950,347 A | 9/1999 | McQueeny |
| 6,041,539 A | 3/2000 | Huamy |
| 6,058,643 A | 5/2000 | Marusak |
| 6,079,145 A | 6/2000 | Barringer |
| 6,094,854 A | 8/2000 | Dalier |
| 6,101,758 A | 8/2000 | Finley |
| 6,108,961 A | 8/2000 | Milawski |
| 6,112,450 A | 9/2000 | Studanski |
| 6,115,957 A | 9/2000 | Bocachi |
| 6,176,035 B1 | 1/2001 | Somogyi |
| 6,233,864 B1 | 5/2001 | Mathews |
| 6,453,599 B2 | 9/2002 | Mathews |
| 6,508,029 B2 | 1/2003 | Grindley |
| 6,510,646 B1 | 1/2003 | Kechriotis |
| 6,609,326 B2 | 8/2003 | Salonen |
| 6,820,365 B1 | 11/2004 | Donnelly |
| 7,254,916 B2 | 8/2007 | Mussot |
| 2005/0086849 A1 | 4/2005 | Perrick |
| 2005/0229474 A1 | 10/2005 | Braaten |
| 2006/0112608 A1 | 6/2006 | Snyder |
| 2006/0117641 A1 | 6/2006 | Kumlin |
| 2006/0191186 A1 | 8/2006 | Perrick |
| 2006/0196103 A1 | 9/2006 | Mussot |
| 2007/0006518 A1 | 1/2007 | Claverie |
| 2007/0101634 A1 | 5/2007 | Clapp |
| 2007/0101635 A1 | 5/2007 | Rike |
| 2007/0240359 A1 | 10/2007 | Jalbert |

* cited by examiner

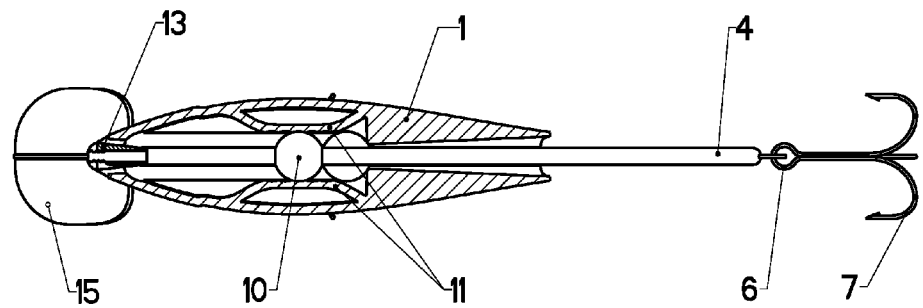
FIG. 4
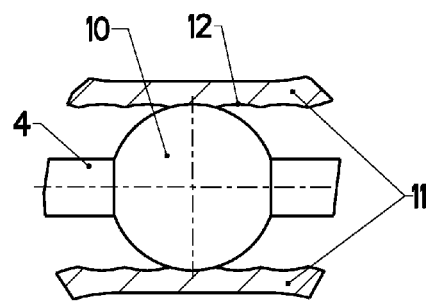
FIG. 5
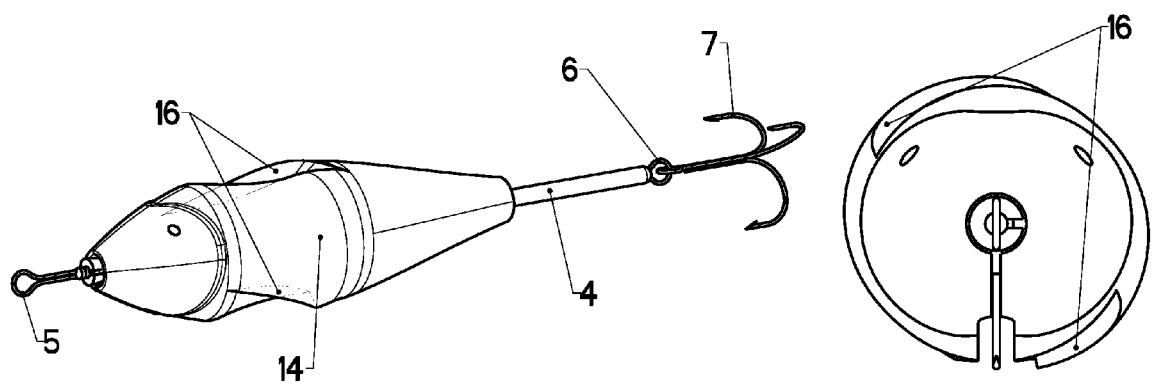
FIG. 6
FIG. 7

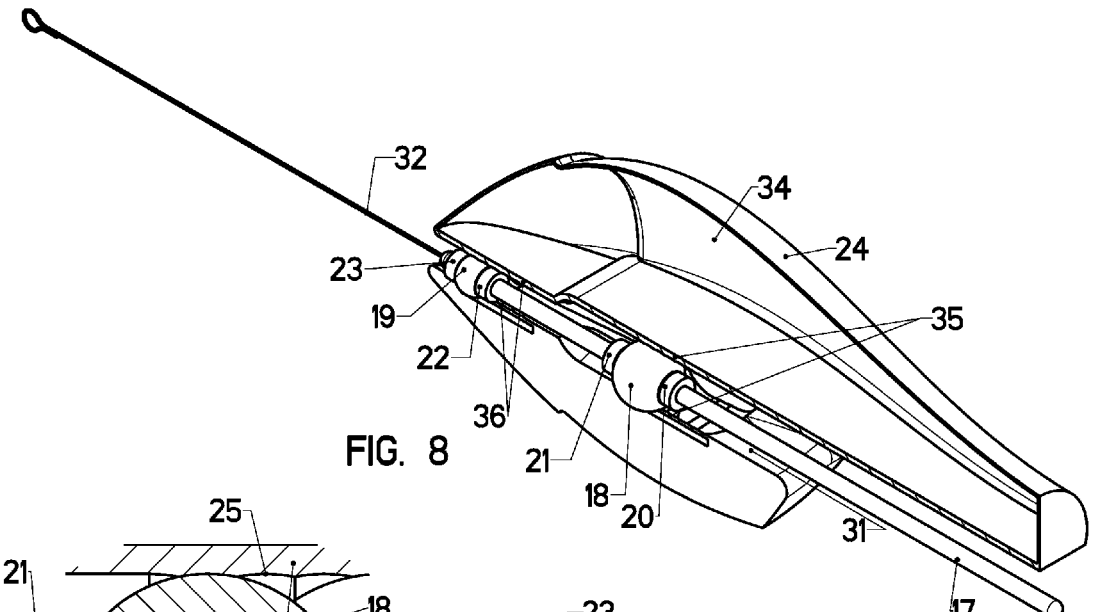
FIG. 8
FIG. 9
FIG. 10
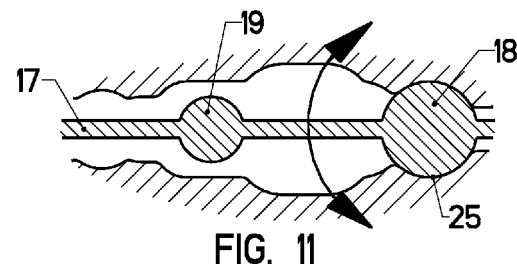
FIG. 11
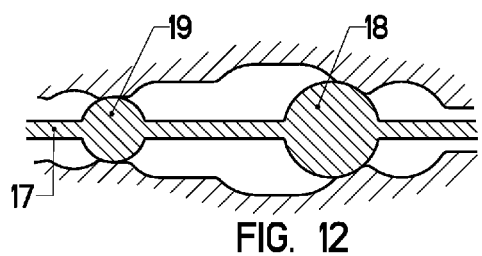
FIG. 12
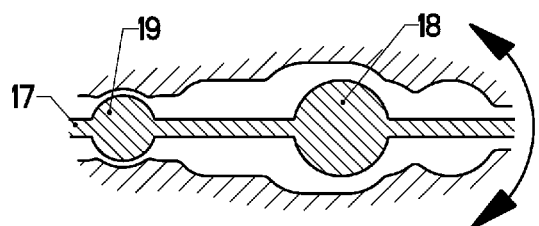
FIG. 13
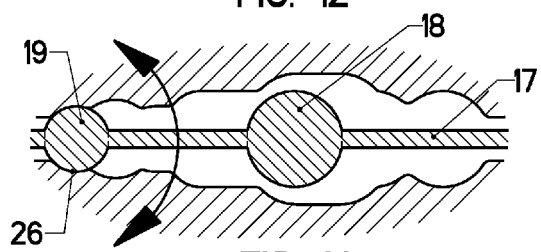
FIG. 14

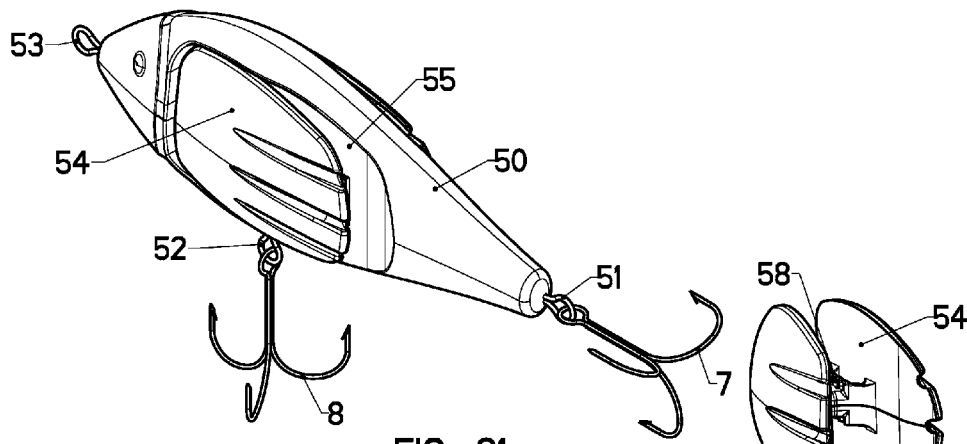
FIG. 21
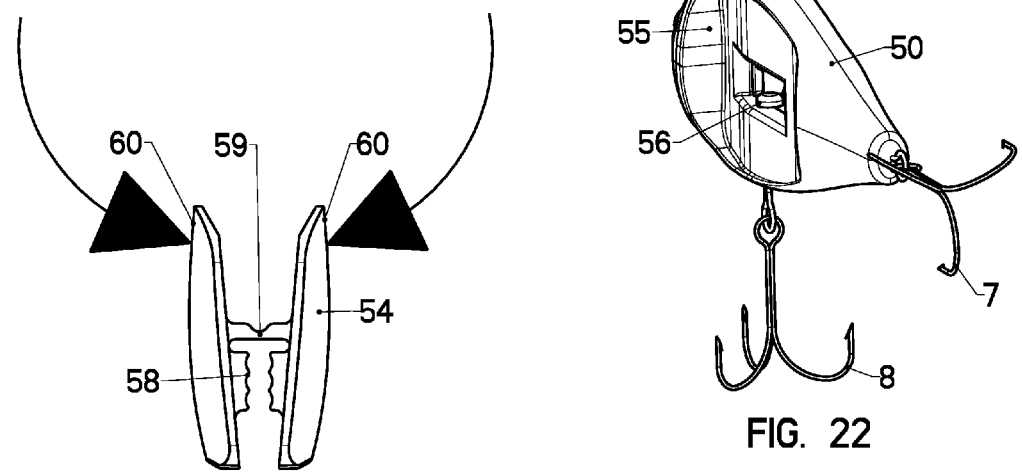
FIG. 23
FIG. 22
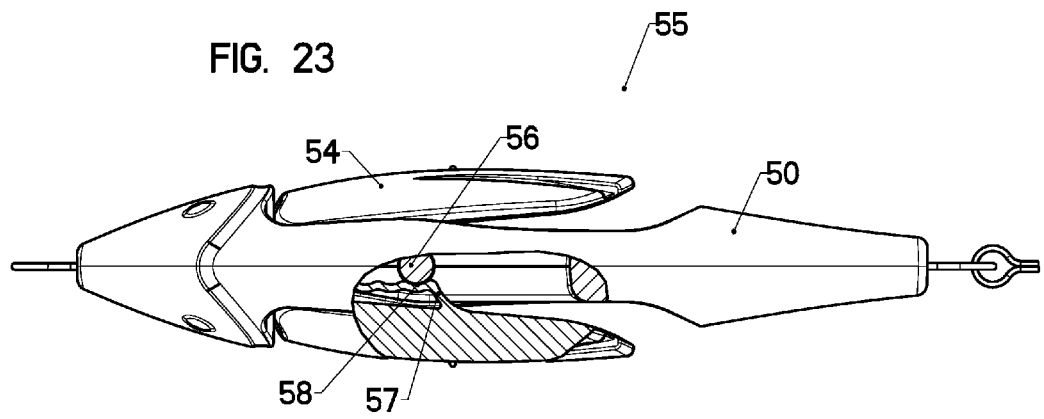
FIG. 24

US 7,757,425 B2

FISHING LURE

TECHNICAL FIELD OF THE INVENTION

The invention relates to fishing lures used when angling with a fishing rod and a fishing line. Such lures could be used for fishing both salt water and fresh water fish.

More particularly, the invention relates to the fishing lures comprising at least two separate elements, which constitute lure body, and at least one hook attached to it.

BACKGROUND OF THE INVENTION

Any fishing lure has two fundamental functions: (1) to attract fish and, ultimately, provoke it to attack the lure and (2) to have such fish reliably affixed to the lure upon such attack, so it could be retrieved from water by a fisherman. Existing lures use following methods to realize first function:

produce mechanical fluctuations of entire lure or a part of one which are transmitted via water environment to the fish receptors;

reproduce general shape, size and color which are typical for a fish prey of a target predatory fish;

use other attraction factors.

In most cases realization of the second function is accomplished by equipping the fishing lures with one or more hooks.

Designs of the fishing lure which allow to produce mechanical fluctuations of its parts are widely known and are realized, for example, in the fishing lure according to U.S. Pat. Nos. 4,135,323, 4,435,914, 6,508,029, 6,108,961, 6,820,365. These lures contain at least one vibrating member, which is structurally separated from the rest of the lure. Such vibrating members move, more specifically rotate, relative to the base part of a lure. Base part is equipped with one or more hooks. Such lures do not allow producing any types of the fluctuations other than rotational movement of vibrating members. Also, vibration parameters could not be adjusted and vibrating members could not be replaced with different ones. Besides, such design does not allow relative move of vibrating member and base part of the lure in retrieval direction upon fish strike. This reduces reliability of hooking of the fish, because the entire lure needs to be dragged until at least one of the hooks will be set in contact with a fish. Under such conditions there is a danger of the lure to be relieved by the fish, because there is outside force applied to the lure.

Lure according to U.S. Pat. No. 4,266,360 allows relative move of vibrating member and base part of the lure, but such a move could not be performed in retrieval direction. Also, vibrating members could be replaced with different ones. The lure can produce planar vibrations, but in working state vibrating member and base part constitute one solid object, so it has all the disadvantages of traditional lures.

Similarly, lures per US patent applications Ser. No. 20060191186A1 and 20070240359A1 allow replacement of the vibrating member or reversible location of one respectfully, but still those lures represent solid object kind of the lures, which produce one type of the vibration with entire lure body.

Lure according to U.S. Pat. No. 4,735,012 in addition to vibrating member, comprises deflector lip on base part. This allows to achieve fluctuations due to rotational movement of the vibrating member and lure movement trajectory change due to planar fluctuations caused by the deflector. Nevertheless, lure action as well as fluctuation parameters are fixed and can not be changed by a fisherman otherwise that by changing retrieval method or speed.

SUMMARY OF THE INVENTION

It is a principal object of the present invention to provide a fishing lure that will have big range of possible action variants due certain amount of degrees of freedom in two lure's members—skeleton and vibrating body—joint, which amount of degrees of freedom could be changed by fishermen, allowing the vibrating body movement relative to the skeleton and generating wobbling movements by the way of planar or three dimensional vibrating around axes perpendicular to a retrieval direction and/or rotating around an axis which is collinear or parallel to a retrieval direction.

It is another object of the present invention to provide fishing lure, which allows for different combinations, which produces different kind of the lure actions, by having lure that contains numerous skeletons and vibrating bodies, which are interchangeable.

It is another object of the present invention to provide fishing lure which is easily reassembled without detaching from a fishing line, by arranging a slot in one of the members.

It is another object of the present invention to provide fishing lure which facilitates different kind of vibrations by having members that comprise water vane or helical vane flanges.

It is another object of the present invention to provide fishing lure which allows to adjust fluctuations amplitude by providing an angular adjustment limiter, which is attached to skeleton with ability to change relative location of the angular adjustment limiter by moving it on a fixed distance along a retrieval direction.

It is another object of the present invention to provide fishing lure with the vibrating body resembling the one of a fish prey and comprising the axle channel for skeleton axle to move in.

It is another object of the present invention to provide fishing lure with the vibrating body and skeleton together forming a fish-like shape and a pocket within skeleton for vibrating body.

It is another object of the present invention to provide fishing lure with ball-and-socket joint type connection between the vibrating body and skeleton, and having such a joint adjustable by multiple ball elements and/or socket elements, thus providing adjustable system for wobbling frequency modulation and having such ball elements shaped as a sphere, which ball elements might constitute separate parts and be attached to one of the members with possibility to turn around an axis collinear or parallel to a retrieval direction, by mean of bearings, for example.

It is another object of the present invention to provide fishing lure with spring type connection between the vibrating body and skeleton, where such a spring plays two functions—provides flexible joint to facilitate for side-to-side fish attracting wobbling movements and enables and limits relative movements of the vibrating body and the skeleton along retrieval direction, which serves for easier hooking of the fish.

It is another object of the present invention to provide fishing lure with multiple vibrating bodies connected to the skeleton.

It is another object of the present invention to provide fishing lure with a lead permanently connected to the head part of the skeleton.

It is yet another object of the present invention to provide fishing lure which has one of the members comprising flanges limiting relative movement of the vibrating body and the skeleton along retrieval direction, thus allowing the lure members to stay in a fixed relative position and retain stabile vibration parameters.

It is yet another object of the present invention is provide fishing lure which has one of the members comprising at least one springy element between parts of said member and lever areas on a said member, which allows to release an engagement between ball element and socket elements, move said member along retrieval direction and setting up new engagement.

It is yet another object of the present invention is to provide fishing lure one of the members of which or such member's part is hollow and isolated from outside environment, thus changing floating properties and orientation in water of such member.

DESCRIPTION OF THE DRAWINGS

Present invention may have several embodiments, all of which correspond and reflect the provisions of the claims and resolve aforementioned tasks, nevertheless having different construction and appearance. Five most preferable embodiments are illustrated by the following drawings:

FIG. 1 through FIG. 7—Fishing lure having one ball element and one retainer of socket elements.

FIG. 8 through FIG. 14—Fishing lure having two ball elements rotably attached to the skeleton.

FIG. 21 through FIG. 24—Fishing lure having two members forming outer shape of the lure with closed pocket for the vibrating body.

Figure 25:
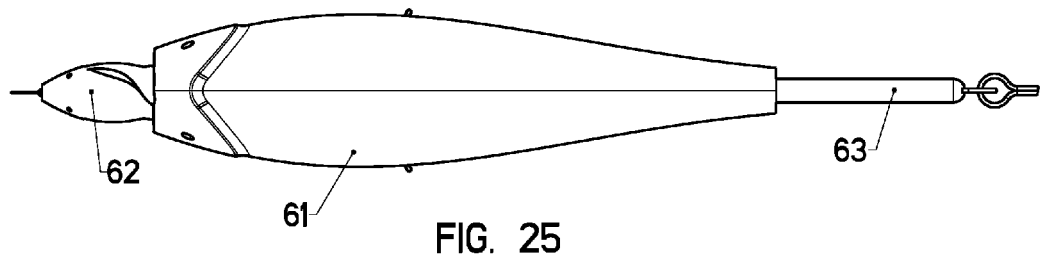
Figure 26:
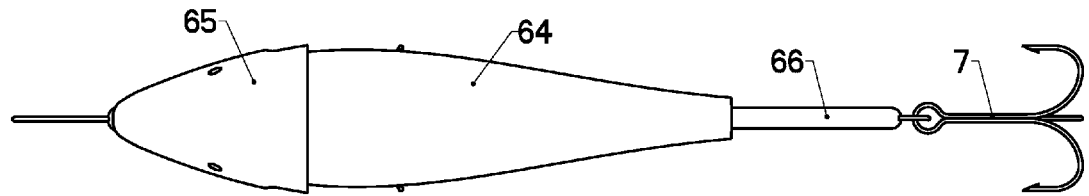
Figure 27:
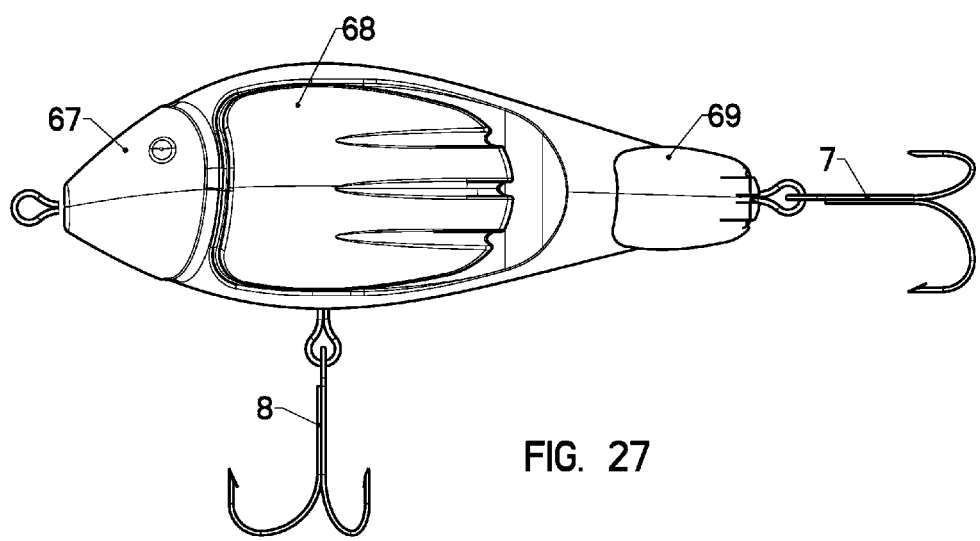

Additional variants on FIG. 25 through FIG. 27 depict fishing lures with the multiple vibrating bodies connected to a single skeleton.

Drawings are described in more detail below.

Figure 1:
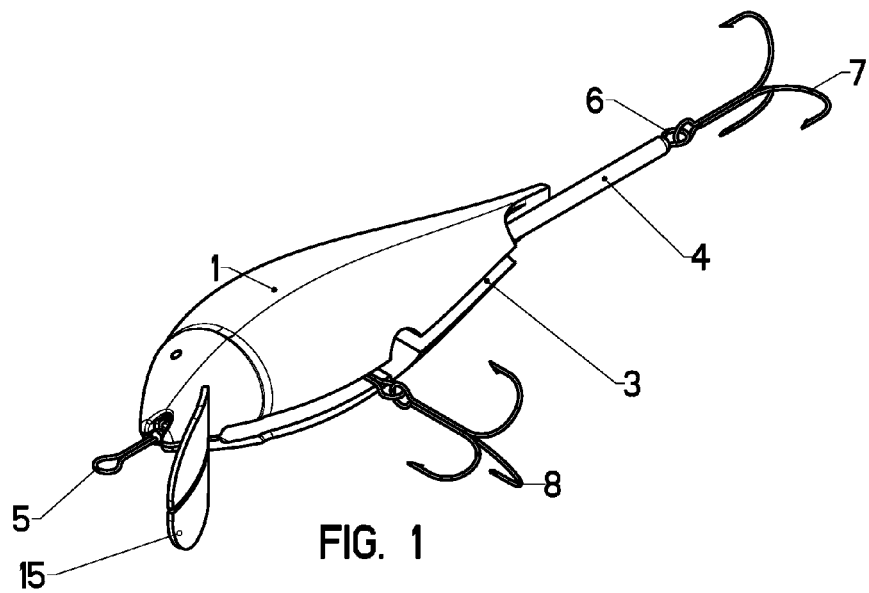
Figure 2:
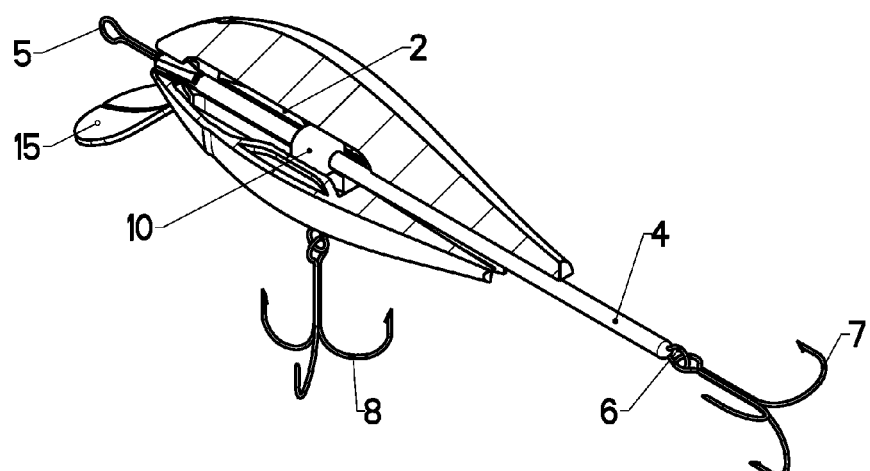
Figure 3:
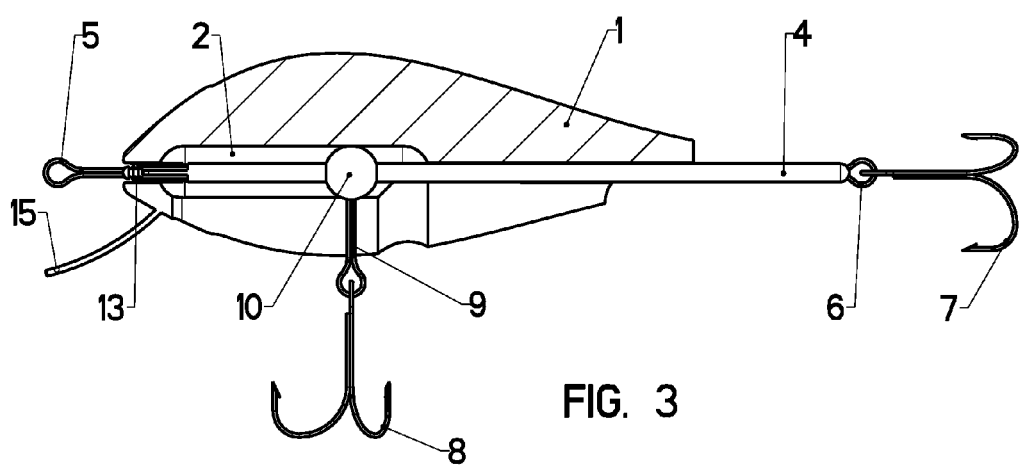

FIG. 1 is axonometric view of the lure in lying position;

FIG. 2 is axonometric view of the lure in working position—one which is taking place under retrieval conditions. Vibrating member one quarter cutout has been drawn to show the members relative location and connection;

FIG. 3 is a side view of the lure with cross section of the vibrating member. It shows how the channel in vibrating member is arranged and how a slot for inserting one of the members in another one could be configured;

FIG. 4 is a top view of the lure with cross section of the vibrating member. It shows how the ball element is connected with the retainer and possible location of an angular adjustment limiter.

FIG. 5 is a detailed view of the cross sectional top view as of FIG. 4. It shows ball element—retainer engagement in more detail.

FIG. 6 is axonometric view of the lure equipped with rotable vibrating member.

FIG. 7 is front view of the lure equipped with rotable vibrating member.

FIG. 8 is axonometric view of the lure with two ball elements rotably attached to the skeleton and two socket elements of the retainer. Vibrating member one half cutout has been drawn to show the members relative location and connection. Also, it shows the variant with permanent lead connection to a skeleton part and hollow area arranged in the vibrating member. The hook is not shown;

FIG. 9 is detailed side view cross section of the ball element—friction bearing—skeleton assembly with ball element engaged with the socket element of the retainer;

FIG. 10 is axonometric view of the same as per FIG. 8, but vibrating member one half cutout is made by the horizontal plane.

Figure 15:
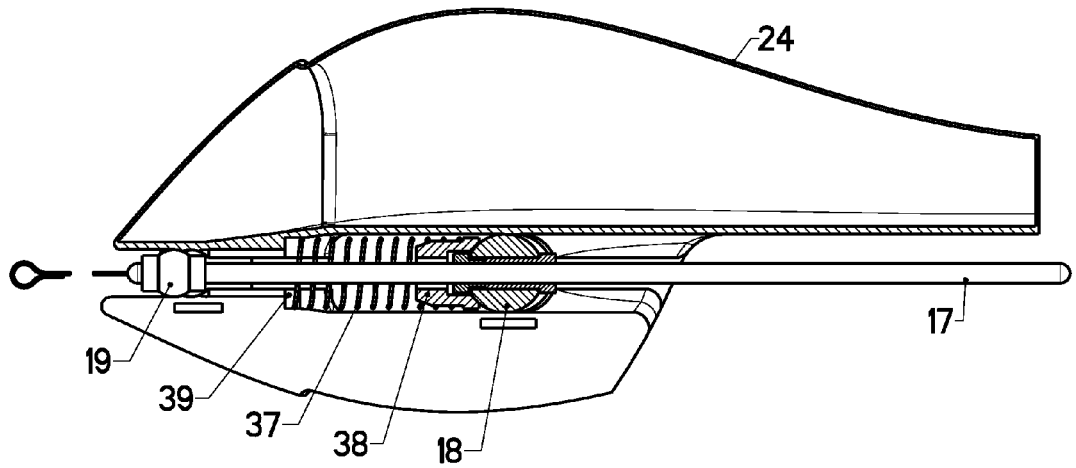
FIG. 15 through FIG. 17—Fishing lure having two ball elements rotably attached to the skeleton and spring type connection between members.
Figure 16:
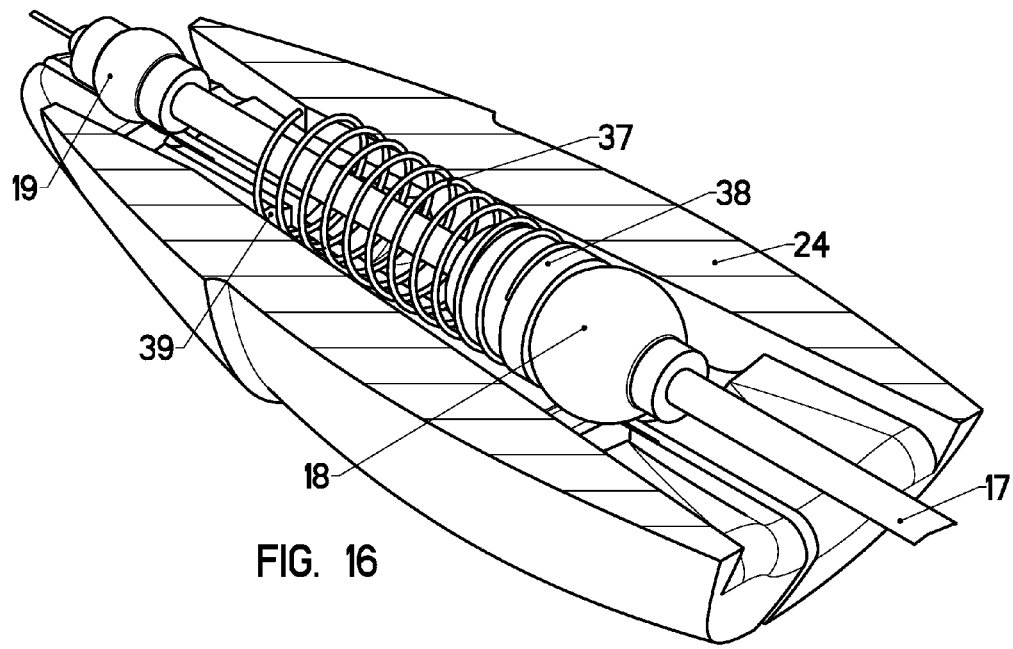
Figure 17:
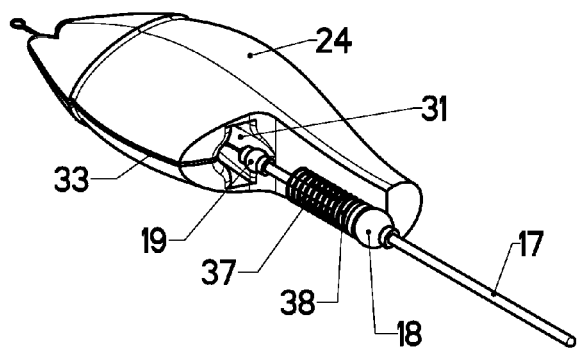

FIG. 11 through FIG. 14 show different ball elements—socket elements relative location combinations and adjusting possibilities, in particular, circular movement of the vibrating member around back ball element within some sector (FIG. 10), fixed vibrating member (FIG. 11), circular movement of the vibrating member around non-fixed center within some sector (FIG. 12), circular movement of the vibrating member around front ball element within some sector (FIG. 13);

FIG. 15 is a side view of the lure which has spring type connection between the vibrating body and skeleton with cross section of the vibrating member. It shows possible configuration of the members and the spring element. The hook is not shown;

FIG. 16 is an axonometric view of the lure same as of FIG. 15 with vibrating member one half cutout, which has been drawn to show the members relative location and connection of the members and the spring element;

FIG. 17 is an axonometric view of the lure same as of FIG. 15 and FIG. 15 with members in the process of disassembling.

Figure 18:
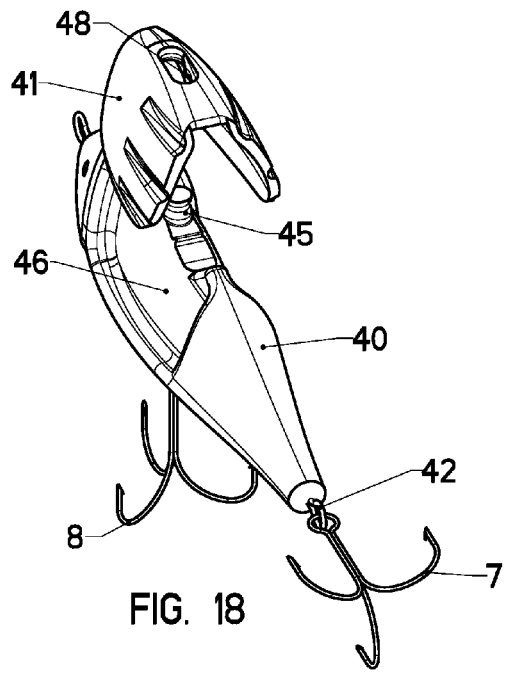
FIG. 18 through FIG. 20—Fishing lure having two members forming outer shape of the lure with open pocket for the vibrating body.

FIG. 18 is an axonometric view of the lure which has vibrating body and skeleton resembling together the prey of the fish in disassembled state. Vibrating body in assembled state is located in open pocket of the skeleton.

Figure 19:
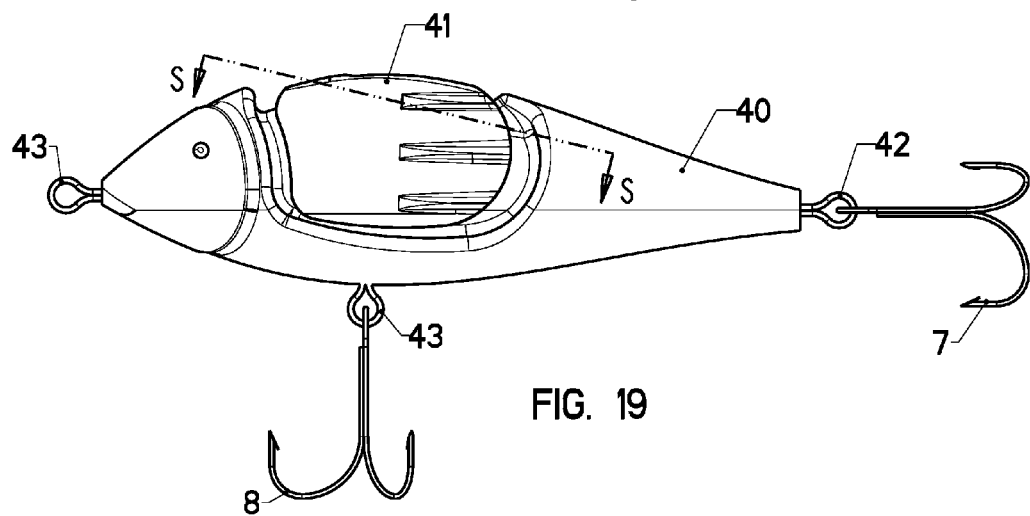

FIG. 19 is a side view of the lure per FIG. 18 in assembled state.

Figure 20:
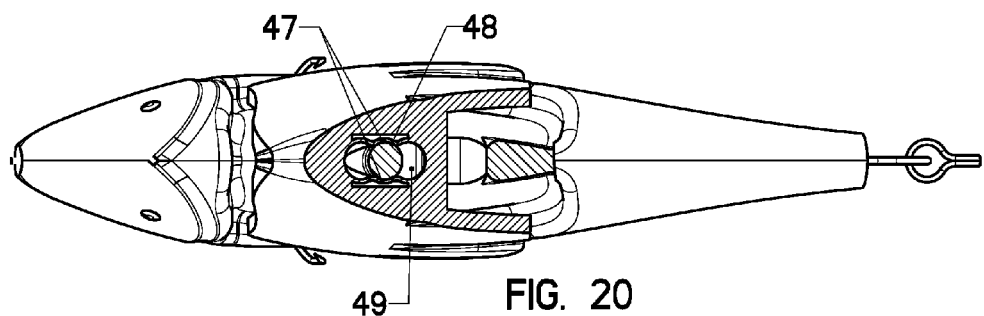

FIG. 20 is a cross section view of the lure per arrows S-S of the FIG. 19. It shows relative location of the members and ball elements—socket elements engagement.

FIG. 21 is an axonometric view of the lure which has vibrating body and skeleton resembling the fish prey in assembled state. Vibrating body is located in a closed pocket across the skeleton.

FIG. 22 is an axonometric view of the lure per FIG. 21 in disassembled state.

FIG. 23 is a top view of a vibrating body variant, which allows easy relocation of this part relative to the skeleton.

FIG. 24 is a top view of the lure per FIG. 21 with partial cross section to show ball elements—socket elements engagement.

FIG. 25 is a side view of the lure with two vibrating bodies connected with one skeleton part with configuration resembling a predator fish attacking its prey.

FIG. 26 is a side view of the lure with two vibrating bodies connected with one skeleton part with configuration representing one fish with two moving body parts—head portion and tail portion.

FIG. 27 is a side view of the lure with two vibrating bodies connected with one skeleton part with configuration representing one fish with two moving body parts—fins and tail.

DETAILED DESCRIPTION OF PREFERRED EMBODIMENT OF THE INVENTION

Drawings described above reflect five main construction types. In spite of all differences, the main principal used in all of the embodiments is the same. The reason for documenting these different embodiments is to illustrate different possibilities this main principal facilitates. All of the features depicted here could be used separately or in combination with each other in order to achieve optimal efficiency under every given fishing conditions. Hereinafter, the main principal will be described based on the first embodiment represented by the drawings on FIG. 1 through FIG. 7. Other configurations and elements different from ones per this first embodiment will be described afterwards.

First embodiment is represented by a fishing lure having two different vibrating bodies—non-rotating vibrating body 1 and rotating vibrating body 14—each of which could be easily assembled with a skeleton 4, thus forming device capable of producing planar or three dimensional fluctuations when non-rotating vibrating body is used; or fluctuations caused by spinning around an axis, which could be combined with planar or three dimensional fluctuations when rotating vibrating body is used.

Skeleton 4 has a shape of the axle and non-rotating vibrating body 1 comprises the axle channel 2 for skeleton 4 to move in. Two members—skeleton 4 and vibrating body 1—are assembled by inserting the skeleton 4 through the slot 3 in vibrating body 1. Angular adjustment limiter 13 is attached to the head portion of the skeleton 4. The same head end of the skeleton 4 has an attachment point 5 to a fishing line. Tail 7 and bottom 8 hooks are attached to the skeleton 4 via attachment means 6 and 9. Also, ball element 10 is attached to the skeleton 4. Said ball element 10 is surrounded with socket elements 12 of the retainer 11, which are affixed to the vibrating bodies 1 and 14. Non-rotating vibrating body 1 can contain water vane 15.

Upon fisherman decision, non-rotating vibrating body 1 is replaced with rotating vibrating body 14. The latter one is equipped with helical vane flanges 16 instead of water vane 15. The lure with rotating vibrating body 14 contains all the elements as one with non-rotating vibrating body 1, described above. Although, bottom hook 8 with a fastener 9 has to be detached from the skeleton 4 in order to allow for spinning motion of the rotating vibrating body 14 relative to skeleton 4. Also, adjustment elements 10, 11, 12 and 13 have to be readjusted.

The device works as follows:

Through the slot 3, vibrating body 1 is installed on skeleton 4, which has angular adjustment limiter 13 and hooks 7 and 8 attached to it. In this assembled position the ball element 10 is engaged with one of the socket elements 12 of the retainer 11. The lure is attached to the fishing line by the attachment point 5. Lure with a fishing line, a fishing rod and a reel together constitute complete set ready to be used for fishing. Before casting of the lure, necessary adjustments of the ball element—socket elements system is performed. It is done by movement of the skeleton 4 with the ball element 10 along the axle channel 2 of the vibrating body 1 on a fixed distance which is defined by the distance between sequential socket elements 12 of the retainer 11. Retainers 11 are made flexible and springy, so the retainers 11 deflect a bit while such adjustment movement of the members one relative to another one until ball element 10 gets engaged with one of the socket elements 12. Engagement of the ball element 10 with the certain socket elements 12 determines specific frequency of the given vibrating body 1 wobbling under given retrieval conditions. Besides, amplitude of the wobbling is adjusted by movement of the angular adjustment limiter 13 along the skeleton 4 axis on a fixed distance. Such movement allows changing the clearance between the members and, thus, a sector for the vibrating body 1 wobbling to take place.

Ones the fishing lure located in water and pulled by the force applied to the skeleton 4, said lure starts to move through the water. This causes hydrodynamic pressure on the outer surfaces of the lure including water vane 15. This makes vibrating body 1 wobbly around the joint. Ones the vibrating body 1 passes the equilibrium point (symmetrical position) the bigger square of the vibrating body 1 is exposed to the water pressure from opposite side with bigger leverage relative to the joint location. This makes the vibrating body 1 to turn in opposite direction after it stops inertia movement. So, being under influence of two forces—hydrodynamic pressure and inertia—the vibrating body 1 continues to wobble while external retrieval force is applied to the lure.

When rotating vibrating body 14 is used then hydrodynamic pressure is applied to the helical vane flanges 16. This causes spinning motion of the rotating vibrating body 14 due to tangential element of the pressure. Besides, depending on angular adjustment limiter 13 shape and location, vibrating body 14 in addition to spinning motion can produce side-to-side or three dimensional wobblings similarly to the lure equipped with non-rotating vibrating body 1, since in this case hydrodynamic pressure also causes a moment in longitudinal direction.

Upon fish strike, vibrating body 1 is firmly kept by the fish jaws. When whether a fisherman will pull the line or the fish would pull the lure while continuing its movement through the water, there is better chance for setting up the hooks of the lure in comparison to prior art lures. In proposed lure skeleton 4 may continue to travel in retrieval direction while vibrating body 1 would stay still relative to the fish's jaw. So, there is bigger probability that the fish would not throw the fishing lure out in the process of setting up the hooks.

FIG. 8 through FIG. 14 show an embodiment for the fishing lure having two ball elements 18 and 19 rotably attached to the skeleton 17 and two retainers 35 and 36.

According to this design vibrating body 24 is hollow and it's inside space 34 is isolated from outside environment. This helps to maintain proper upward position of the fish-like body while the lure is placed in the water. Two ball elements 18 and 19 are assembled with the skeleton 17 by inserts 20 and 22 with caps 21 and 23. Each ball element—insert couple constitutes friction bearing. Vibrating body 24 contains two retainers 35 and 36, each of which comprises socket elements 25 and 26 and inner lugs 27 and 28. Said lugs 27 and 28 form slots 29 and 30 in side-to-side fluctuation direction. A lead 32 might be permanently connected to the skeleton 17. This helps to assure that the line is not damaged upon fish strike, provides proper attachment of the lure and facilitates assemble-disassemble ease. In the process of assembling the lead 32 is inserted in the slot 33 in the vibrating body 24 and then the vibrating body 24 is inserted along the channel 31 until ball elements 18 and 19 get engaged with desirable socket elements and/or slots of the retainers 35 and 36 of the vibrating body 24. Schematic drawings on FIG. 11 through FIG. 14 show possible combinations of engagement types between ball elements 18 and 19 and vibrating body 24 elements. One of the ball elements 18 or 19 could be engaged with corresponding socket element of the retainers 35 or 36, like on FIG. 11 and FIG. 14, while another ball element could have a clearance with the vibrating body 24 elements. In such a case, vibrating body 24 would wobble around such engaged ball element 18 or 19. When both of the ball elements 18 and 19 are engaged with corresponding socket element of the retainers 35 or 36, like on FIG. 12, then it would constitute static position of the vibrating body 24 relative to skeleton 17, which would mean that these two members will perform consolidated wobbling similar to conventional lure. When both ball elements 18 and 19 have clearance with vibrating body 24 elements, like on FIG. 13, then movement of the vibrating body 24 relative to skeleton 17 would be limited by lugs 27 and 28, so the ball elements 18 and 19 would roll along slots 29 and 30. Center of wobbling in such a case will be variable. Such structure gives numerous possible assembling combinations which would serve for bigger range of possible vibration parameters.

FIG. 15 through FIG. 17 show the fishing lure spring type connection between members. All elements similar to the ones used in previous embodiment (FIG. 8 through FIG. 13) have the same position numbers. As per this design, the skeleton 17 with two ball elements 18 and 19 rotably attached to it is assembled with vibrating body 24 by a spring 37. Guiding insert 38 facilitates connection between one end of the spring 37 and the ball element 18. Guiding pocket 39 in vibrating body 24 helps to affix another end of the spring 37 so it is collinear with retrieval direction. The spring 37 plays performs two functions—(a) after vibrating body 24 is turned to one side due to hydrodynamic pressure on one side of the vibrating body 24 outer surfaces, it is returned to symmetrical position due to spring reaction in addition or instead of hydrodynamic pressure on another side of the vibrating body 24 outer surfaces; (b) upon fish strikes the lure facilitates setting of the hook as it's described for the first embodiment. Within this process the spring 37 is compressed and the members move one relative to another. After strike conditions stop, the spring 37 expands back to normal position and returns the members to relaxed position.

FIG. 17 illustrates the process of assembling/disassembling, which is similar to the one of the lure per previous embodiment (FIG. 8 through FIG. 13), except for the spring 37 with the guiding insert 38 which need to be inserted into the channel 31 of the vibrating body 24 together with skeleton-ball elements assembly.

FIG. 18 through FIG. 24 depict fishing lure of a different appearance concept. They have two members together forming outer shape of the lure with a pocket for vibrating body. First embodiment of this type (FIG. 18 through FIG. 20) constitutes a fishing lure which contains skeleton 40 with a fish-like shape and vibrating body 41 shaped like a portion of a fish body, for example like fins. Skeleton 40 comprises a ball element 45. Vibrating body 41 contains retainer 47 with socket elements 48. Vibrating body 41 is assembled and disassembled with skeleton 40 through the slot 49. Skeleton 40 can comprise open pocket 46 for vibrating body 41 to move in. This allows assembled lure to have smooth appearance of a fish. Similarly to previous embodiments, tail 7 and bottom 8 hooks are attached to the skeleton 40 via attachment means 42 and 43. Second embodiment of this type (FIG. 21 through FIG. 24) differs from the first one (FIG. 18 through FIG. 20) by the way skeleton 50 and vibrating body 54 are configured. In assembled state vibrating body 54 is located the way socket elements 58 of the retainers 57 are engaged with ball elements 58 inside the skeleton 50. This requires closed pocket 55 to be arranged across the skeleton 50. Two halves of the vibrating body 54 may be connected by a springy element 59 and comprise leverage areas 60. Such structure allows releasing ball element 58 and socket elements 58 of the retainer 57 engagement, moving vibrating body 54 along retrieval direction and setting up new engagement.

One skeleton 63, 66 or 67 can be used with two or more vibrating bodies 61 and 62, or, 64 and 65, or, 68 and 69, as it is shown on FIG. 25 through FIG. 27. This allows employing more attracting factors and achieving more realistic lure action.

Beside advantages described above, presented fishing lure allows producing rattling noise while moving through the water due to contact between members when vibrating body performs side-to-side or three-dimensional motions.

While only a few exemplary embodiments have been described in detail, it will be understood that the principle of the invention is equally applicable to other embodiments, for example lures that imitate nature creatures other than a fish or does not imitate appearance of any natural object. It also will be understood that the invention is applicable to the lures which represent a split between skeleton and vibrating body made in different place and manner than one of the embodiments presented hereinbefore, for example skeleton part representing head part of the fish body with axle and vibrating body representing the rest of the fish body with channel inside. It also will be understood that the invention is applicable to the lures which are made of different materials or combination of different materials, for example vibrating body or its part made of soft plastic. It still also will be understood that the invention is applicable to the lures which comprise members of different shapes and colors, which facilitates adjusting these attracting factors by fishermen during fishing.

What is claimed is:

1. A fishing lure comprising:
    a skeleton (4) comprising a first end, a middle section, a second end, an attachment point to a fishing line (5) connected to the first end of the skeleton and at least one hook (7) attached to the second end of the skeleton;
    a vibrating body (1) having a top side, a middle side, a bottom side, an axle channel (2) running through the entire length of the middle side of the vibrating body and a horizontal slot running through the entire length of the bottom side of the vibrating body, wherein the skeleton is inserted through the horizontal slot into the axle channel;
    an angular adjustment limiter attached between the first end of the skeleton and the attachment point to the fishing line;
    a ball element (10) attached to the middle section of the skeleton (4),
    a retainer (11) with at least one socket element (12) affixed to the inside of the vibrating body;
    wherein said ball element (10) contacts one of said socket elements (12);
    wherein the vibrating body (1) moves relative to the skeleton (4) generating mechanical fluctuations by way of planar or three-dimensional vibrations around an axis perpendicular to a retrieval direction and/or rotating around an axis which is collinear or parallel to the retrieval direction.

2. The fishing lure according to claim 1, wherein the skeleton (4) and the vibrating body (1) are interchangeable.

3. The fishing lure according to claim 1, wherein the vibration body rotates around the skeleton.

4. The fishing lure according to claim 1, wherein said skeleton (4) has a shape of a rod and said vibrating body (1) resembles a fish prey.

5. The fishing lure according to claim 1, wherein the skeleton (17) is connected with the vibrating body (24) by a spring (37), allowing a side-to-side wobbling of said vibrating body (24).

6. The fishing lure according to claim 5, wherein the operating direction of said spring (37) is collinear or parallel to a retrieval direction and enables and limits relative movements of said vibrating body (24) and said skeleton (17) along the retrieval direction.

7. The fishing lure according to claim 1, wherein the vibrating body (41) resembles a part of a body of the fish prey and the skeleton (40) resembles the fish prey.

8. The fishing lure according to claim 7, wherein said skeleton (40) comprises a pocket (46) for placing and moving of the vibrating body.

9. The fishing lure according to claim 1, wherein said vibrating body (1) is connected with said skeleton (4) by a joint (10, 12).

10. The fishing lure according to claim 1, wherein a top part of said vibrating body (34) is hollow and isolated from outside environment, which helps said vibrating body (34) to remain in vertical position while moving through the water.

11. The fishing lure according to claim 1, wherein the multiple vibrating bodies (61) and (62) are connected to the skeleton (63).

12. The fishing lure according to claim 1, wherein said skeleton (17) comprises a lead (32) permanently connected to the head part of the skeleton.

13. The fishing lure according to claim 1, wherein said ball element (10) is shaped as a sphere or a portion of a sphere.

14. The fishing lure according to claim 1, wherein said retainer (11) is made of a flexible and springy structural elements.

15. The fishing lure according to claim 1, wherein the ball element constitutes a separate part and rotates around an axis collinear or parallel to the retrieval direction.

16. The fishing lure according to claim 15, wherein said ball element (18) is assembled with said skeleton (17) using friction bearings (20, 21).

17. The fishing lure according to claim 1, which comprises multiple ball elements (18) and (19) and multiple retainers (35) and (36) allowing different combinations of engagements, so whether at least one ball element (18) or (19) is engaged with the socket element (25) or (26), while other ones have clearance with retainers (35) and (36), or at least two ball elements (18) and (19) are engaged with the socket elements (25) and (26) of the retainers (35) and (36), or all of the ball elements (18) and (19) have clearance with the retainers (35) and (36).

18. The fishing lure according to claim 17, further comprising at least one member having at least one springy element (59) between parts of said member (54) and leverage areas (60) on said member (54), which allows to release the ball element (56) from the engagement with the socket element (58) of the retainer (57), to move said member (54) along retrieval direction and setting up new engagement between said ball element and said socket element.

19. The fishing lure according to claim 1, wherein one of said ball elements comprises inner lugs (27) and (28) limiting relative movement of said vibrating body (24) and said skeleton (17) along retrieval direction, and said lugs (27), (28) form slots (29), (30) in side-to-side wobbling direction.

20. A fishing lure comprising:
a skeleton (4) comprising a first end, a middle section, a second end, an attachment point to a fishing line (5) connected to the first end of the skeleton and at least one hook (7) attached to the second end of the skeleton;
a vibrating body (1) having a top side, a middle side, a bottom side, an axle channel (2) running through the entire length of the middle side of the vibrating body and a horizontal slot running through the entire length of the bottom side of the vibrating body, wherein the skeleton is inserted through the horizontal slot into the axle channel;
an angular adjustment limiter attached between the first end of the skeleton and the attachment point to the fishing line;
a ball element (10) attached to the middle section of the skeleton (4);
a retainer (11) with at least one socket element (12) affixed to the inside of the vibrating body, wherein said retainer (11) is made of a flexible and springy structural elements;
wherein said ball element (10) contacts one of said socket elements (12);
at least one water vane (15) affixed to it the outer side of the vibrating body;
wherein the vibrating body moves relative to the skeleton inside the axle channel;
wherein to adjust relative location of the skeleton 4 and the vibrating body, the skeleton 4 moves inside the channel until the ball element 10 engages with one of the socket elements 12, which determines a specific frequency for the wobbling of the vibrating body.

21. A fishing lure comprising:
a skeleton (4) comprising a first end, a middle section, a second end, an attachment point to a fishing line (5) connected to the first end of the skeleton and at least one hook (7) attached to the second end of the skeleton;
a vibrating body (1) having a top side, a middle side, a bottom side, an axle channel (2) running through the entire length of the middle side of the vibrating body and a horizontal slot running through the entire length of the bottom side of the vibrating body, wherein the skeleton is inserted through the horizontal slot into the axle channel;
an angular adjustment limiter attached between the first end of the skeleton and the attachment point to the fishing line;
a ball element (10) attached to the middle section of the skeleton (4);
a retainer (11) with at least one socket element (12) affixed to the inside of the vibrating body, wherein said retainer (11) is made of a flexible and springy structural elements;
wherein said ball element (10) contacts one of said socket elements (12);
helical vane flanges (16) located on the its outer surface of the vibrating body;
wherein the vibrating body moves relative to the skeleton;
wherein to adjust relative location of the skeleton 4 and the vibrating body, the skeleton 4 moves inside the channel until the ball element 10 engages with one of the socket elements 12, which determines a specific frequency for the wobbling of the vibrating body.

* * * * *